N. L. CHAPPELL.
STEAM EJECTOR.
No. 67,413. Patented Aug. 6, 1867.
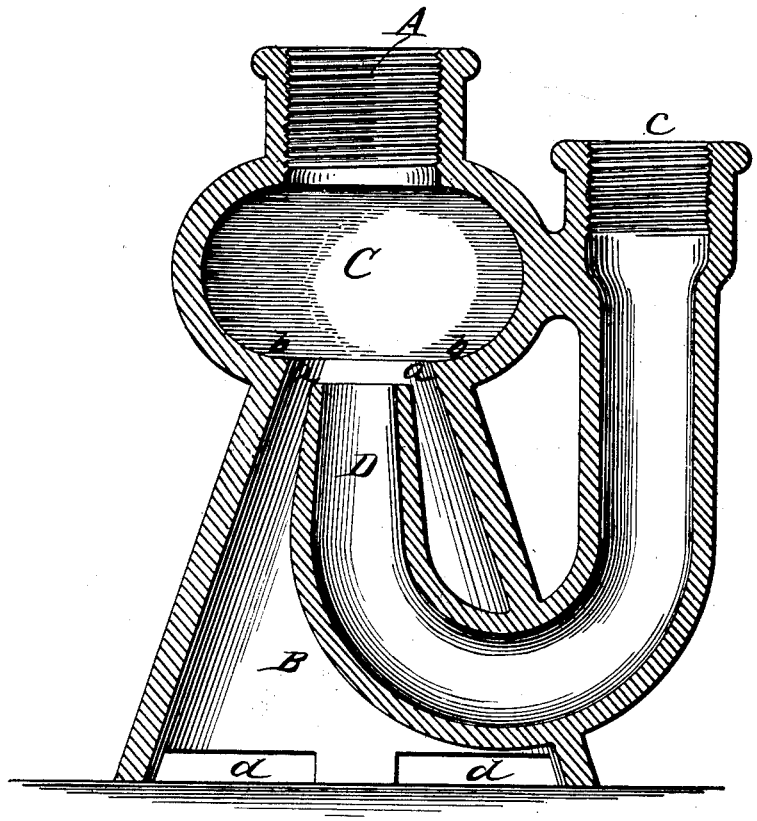

United States Patent Office.

NATHAN L. CHAPPELL, OF NEW YORK, N. Y., ASSIGNOR TO THE CHAPPELL PATENT STEAM VALVELESS PUMP AND BILGE EJECTOR MANUFACTURING AND FURNISHING COMPANY OF NEW YORK.

*Letters Patent No. 67,413, dated August 6, 1867*

IMPROVEMENT IN STEAM-EJECTORS.

*The Schedule referred to in these Letters Patent and making part of the same.*

TO ALL WHOM IT MAY CONCERN:

Be it known that I, NATHAN L. CHAPPELL, of the city, county, and State of New York, have invented certain new and useful improvements in Ejectors for Raising Water and other liquids; and I do hereby declare that the following is a full, clear, and exact description of the same, reference being had to the accompanying drawing, making a part of this specification, which is a vertical section of an ejector constructed according to my invention.

This invention consists in a novel construction of an ejector for raising water or other liquids, whereby the most efficient action of the steam-jet upon the column of liquid is obtained, and the reaction of the said column of liquid upon the steam-jet is effectually prevented, so that the ejector is enabled to force the liquid to a much greater height than those heretofore devised, and whereby any obstruction which may be drawn into the ejector may be quickly and easily removed therefrom without removing or detaching any of the parts thereof.

To enable others to understand the nature and construction of my invention, I will proceed to describe it with reference to the drawing.

The apparatus may be made of cast iron or other suitable material, and cast in one piece, as represented in the drawing.

A indicates a tubular socket formed in the upper part of the ejector, and into which is screwed the discharge pipe through which the ascending column of water is forced, and B shows the inlet-chamber formed in the lower portion of the apparatus, and provided with inlet openings or passages at its lower end, through which the liquid enters the aforesaid inlet-chamber. This inlet-chamber is made conical in shape, or, in other words, in the form of an inverted funnel, with its throat or upper end much contracted as shown at $a$. Situated between this throat $a$ and the lower end of the socket A, or, in other words, immediately below the lower end of the outlet pipe, screwed into the said socket as just described, is a chamber, C. This chamber may be made of a nearly globular form, as shown in the drawing, or of any other suitable or desired shape, and the bottom or lower side thereof constitutes a nearly flat annular shoulder, $b$, around the throat $a$ where the said throat enters the aforesaid chamber C. The steam-inlet pipe is shown at D, and has its inner portion situated centrally in the inlet-chamber B, with the opening or orifice at the end thereof placed at the distance of one-fourth of an inch, more or less, from the upper end of the throat $a$. This steam-inlet pipe is curved, as shown in the drawing, and passes through the side of the inlet-chamber B, and may have a screw socket formed upon its outer end, as shown at $c$, into which is screwed the end of a suitable steam-conducting pipe. The water or other liquid to be raised enters the inlet-chamber B, and also fills the chamber C, and the steam jet issuing from the steam inlet pipe D acts upon the said liquid within the throat $a$, to force the liquid upward through the discharge pipe screwed into the socket A, or, in other words, through the opening formed in the said socket, the contracted form of which confines the action of the said steam jet to the lower end or portion of the column of liquid to be raised, or, in other words, prevents any portion of the force of the jet from being distributed laterally and practically lost, as would be the case if the said throat were of the same diameter as the lower portion of the chamber B. At the same time the greater portion of the weight of the liquid above the said throat is sustained by the annular shoulder $b$ in such manner as to prevent the reaction of the ascending column of liquid upon the steam jet, so that by these means the effective action of the said jet in raising the liquid is greatly increased, and the height to which the column of liquid may be forced is increased in proportion. In case any extraneous substance should find its way into the chamber B, and be drawn up toward the throat $a$, so as to obstruct the passage of the liquid through the same, it is only necessary, in order to dislodge such obstruction, to discontinue the steam jet, whereupon the pressure of the liquid forced downward through the throat $a$ by its own weight will force such obstruction downward away from the said throat, such dislodgment of the obstruction being greatly facilitated by the flaring or inclined position of the sides of the chamber B.

What I claim as new, and desire to secure by Letters Patent, is—

The inlet-chamber B, constructed with a contracted throat, $a$, and arranged with reference to the steam-inlet pipe D and chamber C, substantially as herein set forth, for the purpose specified.

N. L. CHAPPELL.

Witnesses:
A. LE CLERC,
HENRY G. BROWN.